United States Patent
Kaneko et al.

(10) Patent No.: US 6,324,148 B1
(45) Date of Patent: *Nov. 27, 2001

(54) OPTICAL DISK AND OPTICAL INFORMATION RECORDING/REPRODUCING APPARATUS

(75) Inventors: Masahiko Kaneko, Kanagawa; Ariyoshi Nakaoki, Tokyo; Katsuhisa Aratani, Chiba, all of (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/839,752

(22) Filed: Apr. 15, 1997

(30) Foreign Application Priority Data

Apr. 15, 1996 (JP) .................................................... 8-115268

(51) Int. Cl.$^7$ ................................. G11B 7/24; B32B 3/00
(52) U.S. Cl. ......................... 369/94; 369/286; 369/272; 369/288; 428/64.1; 428/64.4
(58) Field of Search ................... 369/272, 275.2, 369/283, 286, 288, 275.1, 94; 428/64.1, 64.4, 64.7

(56) References Cited

U.S. PATENT DOCUMENTS

| | | | |
|---|---|---|---|
| 4,670,345 | * | 6/1987 | Morimoto et al. ................ 428/411.1 |
| 4,682,321 | * | 7/1987 | Takaoka et al. ...................... 369/284 |
| 5,009,762 | * | 4/1991 | Maeno et al. .................... 204/192.16 |
| 5,244,774 | * | 9/1993 | Usami et al. ......................... 430/271 |
| 5,627,817 | * | 5/1997 | Rosen et al. ............................ 369/58 |
| 5,666,344 | * | 9/1997 | Imaino et al. .......................... 369/94 |

FOREIGN PATENT DOCUMENTS

| | | | |
|---|---|---|---|
| 5-101461 | * | 4/1993 | (JP) . |
| 6-084222 | * | 3/1994 | (JP) . |

* cited by examiner

Primary Examiner—William Klimowicz
(74) Attorney, Agent, or Firm—Sonnenschein, Nath & Rosenthal

(57) ABSTRACT

An optical disk includes at least two information recording layers on one side of the disk and at least the first information recording layer from the light incident side is of an erasable type formed with a material such as bismuth-substituted magnetic garnet or cobalt ferrite which has an extinction coefficient, a coefficient of an imaginary part of a complex index of refraction, being not more than 1.0, but not less than 0.5, and gives a large magneto-optic effect and a small light absorptivity.

6 Claims, 7 Drawing Sheets

OPTICAL DISK AND OPTICAL INFORMATION RECORDING/ REPRODUCING APPARATUS

BACKGROUND OF THE INVENTION

This invention relates to an optical disk comprising a plurality of information recording layers and an optical information recording/reproducing apparatus for recording/reproducing information on/from the optical disk.

Conventionally, optical disks have been used as information recording media with a large capacity and a random access capability. And, in recent years, optical disks have been strongly demanded to have larger capacities, since information amount handled in information-associated devices is increasing more and more, and necessity of recording larger capacities of information such as digital dynamic picture images has arisen as the information has been presented in multimedia.

To meet such demands, a technology has been proposed lately which enabled information to be read out from each of a plurality of information recording layers provided on one side of an optical disk by changing the focal position of a light for producing information.

As well known, optical disks are classified into three types according to functions; read-only-memory type, write-once type, and erasable type. Each type has its own characteristics and is used differently from others. The erasable type optical disk is excellent in versatility and can be used for writing and reading out dynamic image information, so it is highly expected to be provided with a large capacity. Consequently, one proposal to realize a large capacity erasable optical disk is to provide a plurality of erasable information recording layers on one side of the optical disk. Such a configuration of the disk, however, had a difficulty in being practically used because of a problem to be explained below.

FIG. 1 is a cross sectional view of an erasable optical disk provided with two information recording layers on one side, which is a typical design example of such an optical disk. The optical disk 100 in such a design example is provided with the first information recording part $L_1$, which is partially reflecting; a spacer layer 105; the second information recording part $L_2$; and a reflective film 109 formed sequentially on one side of the substrate 101. The first information recording part $L_1$ comprises a transparent dielectric film 102 made of SiN; an information recording layer 103 made of TbFeCo, which is a typical rare earth-transition metal magnetic material; and a transparent dielectric film 104 made of SiN, which are formed sequentially from the substrate 101. In the same manner, the second information recording part $L_2$ also comprises a transparent dielectric film 106 made of SiN; an information recording layer 107 made of TbFeCo; and a transparent dielectric film 108, made of SiN formed sequentially from the spacer layer 105. The substrate 101 is made of, for example, polycarbonate and the spacer layer 105 is made of, for example, ultraviolet-curing resin. The reflective film 109 is made of, for example, Al.

In the design example shown in FIG. 1, let the refractive index n of SiN be 2.0, the complex index of refraction n–ik of TbFeCo be 3.6–i·4.1, the wave length of the information reproducing light be 690 nm, and the intensity reflectivity of the second information recording part $L_2$ be 30%. In this case, the respective relationships between the thickness d (nm) of the information recording layer 103 and each of the intensity reflectivity $R_1$ of the first information recording part $L_1$, the final intensity reflectivity $R_2$ of the second information recording part $L_2$, which means the ratio of the intensity of the returned light from the second information recording part $L_2$ to the intensity of the incident light to the first information recording part $L_1$, and the light absorptivity A of the first information recording part $L_1$ is as shown in FIG. 2.

In order to stabilize the information reproducing operation in an apparatus for reproducing information from an optical disk having two information recording layers as shown in FIG. 1, both the intensity reflectivity $R_1$ of the first information recording part $L_1$ and the final intensity reflectance $R_2$ of the second information recording part $L_2$ must become almost equal. And, $R_1$ and $R_2$ become almost equal under the above condition when the thickness d of the information recording layer 103 of the first information recording part $L_1$ is about 6 nm. At this time, both $R_1$ and $R_2$ become about 8%. However, it is very difficult to carry out a mass production of such an information recording layer 103 while it is kept accurately to a uniform thickness of about 6 nm. Because the light absorptivity in the information recording layer 103 is too large, the thickness d of the information recording layer 103 must be reduced in such way.

Because of such a problem, it was actually impossible to realize a multi-layer erasable optical disk enabling information to be overwritten at least on the information recording layer provided on the light incident side.

SUMMARY OF THE INVENTION

Under such the circumstances, it is an object of this invention to provide an optical disk which comprises a plurality of information recording layers on one side so that at least the first information recording layer on the light incident side is erasable, and is enabled to be massproduced, as well as to provide an optical recording/reproducing apparatus that can record/reproduce information on/from the optical disk.

The optical disk of this invention comprises a plurality of information recording layers on one side so that the first recording layer on the light incident side is erasable and formed with a material whose extinction coefficient, which is a coefficient of an imaginary part of a complex index of refraction, is 1 or under.

The optical information recording/reproducing apparatus of this invention is for recording/reproducing information on/from an optical disk.

The optical disk used for the apparatus comprises a plurality of information recording layers on one side of the disk and at least a first layer of the information recording layers from a light incident side is of an erasable type formed with a material whose extinction coefficient, a coefficient of an imaginary part of a complex index of refraction, is not more than 1.0, and the apparatus comprises an information recording unit and an information reproducing unit.

The information recording unit records information on the optical disk by projecting and focusing a light for recording the information on an information recording layer being of an erasable type of a plurality of the information recording layers of the optical disk. The information reproducing unit reproduces information from each of the information recording layers of the optical disk by projecting a light having a wavelength suitable for making the extinction coefficient of the first layer be not more than 1.0 with the light being selectively focused on each of the information recording layers for reproducing the information and detecting the light returned from each of the information recording layers.

In the optical disk of this invention, since the first information recording layer on the light incident side is formed with a material whose extinction coefficient, which is a coefficient of the imaginary part of a complex index of refraction to decide the absorption characteristic, is 1 or under, the light absorptivity per unit thickness of the first information recording layer becomes small satisfactorily and the thickness of the first information recording layer and its tolerance can be set large enough to cope with mass production of the optical disk.

In the optical information recording/reproducing apparatus of this invention, information is recorded on the optical disk using the information recording unit in which a light for recording information is projected and focused on the erasable information recording layer of a plurality of the information recording layers and the information is reproduced from the optical disk using the information reproducing unit in which a projected light for reproducing information is selectively focused on each of the information recording layers of the optical disk and the light reflected from the information recording layer is detected.

DETAILED DESCRIPTION OF THE PREFERRED EMBODIMENTS

Hereunder, the first embodiment of this invention will be explained in detail with reference to attached drawings.

Figure 3:
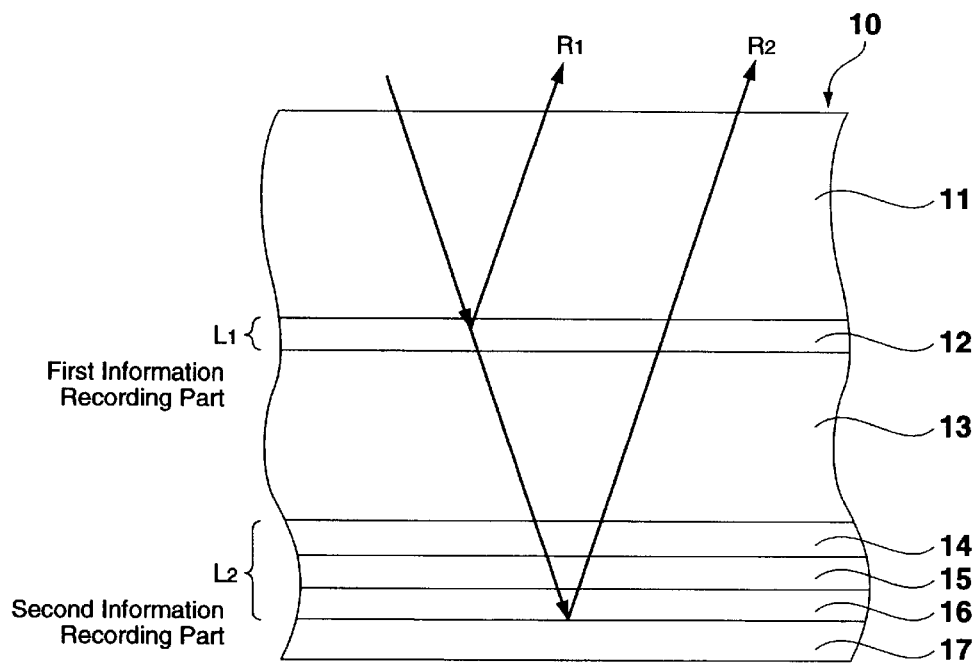
FIG. 3 is a cross sectional view showing a structure of an optical disk in the first embodiment of this invention.

FIG. 3 is a cross sectional view showing a structure of an optical disk in the first embodiment of this invention. The optical disk is designed so as to use a blue laser having a wave length of 500 nm as an information reproducing light. As shown in FIG. 3, the optical disk 10 is provided with the partially reflecting first information recording part $L_1$, a spacer layer 13, the second information recording part $L_2$, and a reflective film 17 formed sequentially on one side of the substrate 11. The first information recording part $L_1$ comprises an information recording layer 12 which is made of a magneto-optical material comprising bismuth-substituted magnetic garnet having a large magneto-optic effect and a small light absorption at a wavelength of 500 nm. The second information recording part $L_2$ comprises a transparent dielectric film 14 made of, for example, SiN, an information recording layer 15 made of a magneto-optical material made of, for example, TbFeCo, and a transparent dielectric film 16 made of, for example, SiN formed sequentially from the spacer layer 13. The substrate 11 is made of, for example, polycarbonate. The spacer layer 12 is made of, for example, ultraviolet-curing resin and the reflective film 17 is made of, for example, Al.

The composition of bismuth-substituted magnetic garnet forming the information recording layer 12 is generally represented by $R_{3-y}Bi_yFe_{5-x}M_xO_{12}$ ($0 \leq x < 5$, $0 \leq y < 3$), where R indicates a rare earth element such as Y, Yb, Sm, Gd, and the like, M indicates a non-magnetic metal element such as Ga, Ge, Al, and the like. A typical composition of the bismuth-substituted magnetic garnet forming the information recording layer 12 is $Y_2BiFe_{5-x}Ga_xO_{12}$. The rare-earth iron garnet such as yttrium iron garnet ($Y_3Fe_5O_{12}$), and the like is a material having a magneto-optic effect, but if a rare earth element such as Y is substituted with Bi at this time, the Faraday rotation is increased. Furthermore, if a non-magnetic metal such as Ga to be substituted with Fe is used to form a vertically magnetized film. In this case, let $Y_2BiFe_{5-x}Ga_xO_{12}$ be used as a composition of the bismuth-substituted magnetic garnet forming the information recording layer 12. The complex index of refraction n–ik of this $Y_2BiFe_{5-x}Ga_xOl_2$ is about $2.5-i\neq 0.12$ at a wavelength of 500 nm and the extinction coefficient k, which is a coefficient of the imaginary part of a complex index of refraction, is about 0.12. And, the Faraday rotation is about $10°/\mu m$. (See Phys. Rev. B12, 2777—2788 (1975).)

Hereunder, how to manufacture the optical disk 10 shown in FIG. 3 will be explained briefly. In this manufacturing method, a substrate 11 on which track guide grooves should be formed by, for example, injection molding in advance. On the surface of this substrate 11 provided with the track guide grooves is formed a bismuth-substituted magnetic garnet film by, for example, a vacuum metallizing method or a sputtering method to form the information recording layer 12. Then, on the information recording layer is formed the spacer layer 13 using, for example, ultraviolet curing resin. Track guide grooves must also be formed on this spacer layer 13 on which the track guide grooves must also be formed for the second information recording part $L_2$. The track guide grooves can be formed on the spacer layer 13 by filling, for example, ultraviolet-curing resin between the information recording layer 12 and a stamper having grooves used to form the track guide groove and then by projecting an ultraviolet light from the substrate 11 on the resin to cure it. After this, on the spacer layer 13 are formed a transparent dielectric film 14, an information recording layer 15, a transparent dielectric film 16, and a reflective film 17 sequentially by vacuum evaporation or sputtering to complete the manufacturing of the optical disk 10 shown in FIG. 3. A protection film may also be formed on the reflective film 17 as needed using ultraviolet resin and the like.

Here, the relationships between the thickness d (nm) of the information recording layer 12 and the intensity reflectivity $R_1$ of the first information recording part $L_1$, the final intensity reflectivity $R_2$ of the second information recording part $L_2$, which is a ratio of the intensity of the returned light from the second information recording part $L_2$ to the intensity of the incident light to the first information recording part $L_1$, and the light absorption index A of the first information recording part $L_1$, will be obtained by calculation whose method is as shown below. At first, consider a medium 1 comprising dielectric materials laminated sequentially from the incident light side, a medium 2 comprising a magneto-optical recording material, and a medium 3 comprising a dielectric material. In this embodiment, the substrate 11 corresponds to the medium 1, the information recording layer 12 corresponds to the medium 2, and the spacer layer 13 corresponds to the medium 3. Let the refractive indexes of the medium 1, the medium 2, and medium 3 be $n_1$, $n_2'=n_2-ik_2$, and $n_3$, respectively. And let the wavelength of the incident light be $\lambda$. Hereafter, a symbol with a prime "'" represents a complex number. If we let the amplitude reflectivity at the boundary surface between media 1 and 2 be $r_{12}'$ and the amplitude reflectivity at the boundary surface between media 2 and 3 be $r_{23}'$, then those are represented by the following expressions.

$$r_{12}'=(n_1-n_2')/(n_1+n_2')$$

$$r_{23}'=(n_2'-n_3)/(n_2'+n_3)$$

The intensity reflectivity $R_1$, of the first information recording part $L_1$ is given by the following expression using the amplitude reflectivity $r_{12}'$ and $r_{23}'$.

$$R_1=|(r_{12}'+r_{23}'.\exp[4\pi in_2'd/\lambda])/(1+r_{12}'.r_{23}'.\exp[4\pi in_2'd/\lambda])|^2$$

Accordingly, if $n_1$, $n_2'$, $n_3$, and $\lambda$ are determined, the relationship between d and $R_1$ is found. On the other hand, if we let the amplitude transmissivity at the boundary surface between media 1 and 2 be $t_{12}'$ and the amplitude transmissivity at the boundary surface between media 2 and 3 be $t_{23}'$, then they are represented by the following expressions.

$$t_{12}'=2n_1/(n_1+n_2')$$

$$t_{23}'=2n_2'/(n_2'+n_3)$$

The intensity transmissivity T of the first information recording part $L_1$ is represented by the following expression using the amplitude transmissivity $t_{12}'$ and $t_{23}'$ $$T=(n_3/n_1).|(t_{12}'.t_{23}'.\exp[2\pi in_2'd/\lambda])|(1=r_{12}'.r_{23}'.\exp[4\pi in_2'd/\lambda])|^2$$

Here, if we let the intensity reflectivity of the second information recording part $L_2$ be 30%, then the final intensity reflectivity $R_2$ of the second information recording part $L_2$ can be obtained by the following expression.

$$R_2=0.3.T^2$$

Then, the light absorptance A of the first inforamtion recording part $L_1$ can be obtained by the following expression.

$$A=1-R_1-T$$

Figure 4:
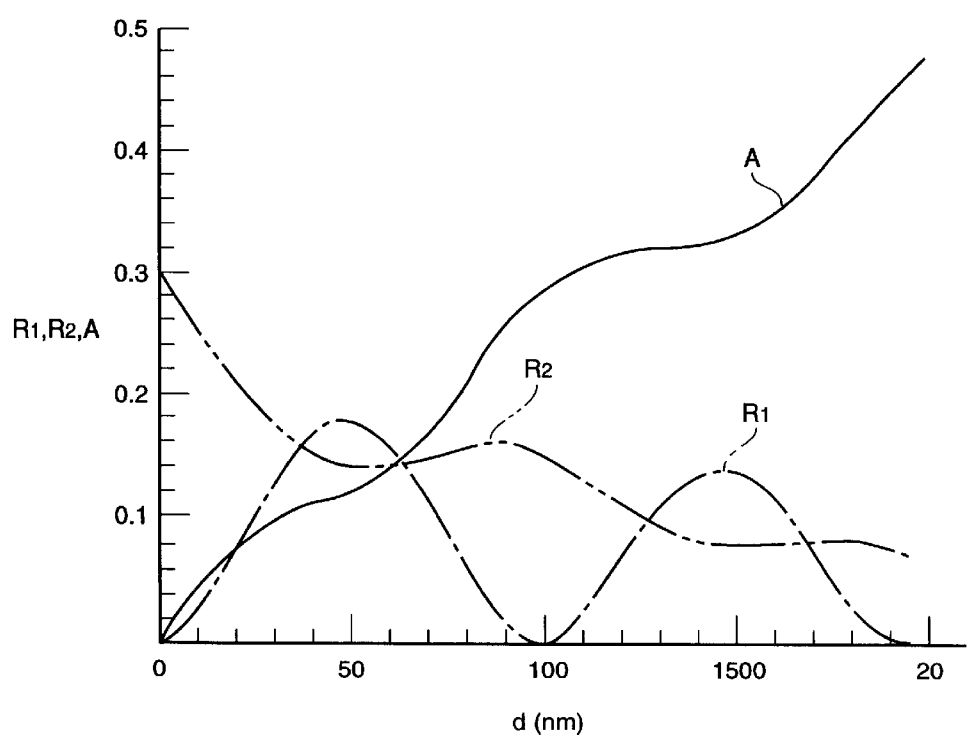
FIG. 4 is a graph showing the respective relationships between the thickness of the information recording layer of the first information recording part of an optical disk in the first embodiment of this invention and each of the intensity reflectivity of the first information recording part, the final intensity reflectivity of the second information recording part, and the light absorptivity of the first information recording part.

FIG. 4 is a graph showing the respective relationships between d and each of $R_1$, $R_2$, and A obtained by the above calculating methods taking the refractive index $n_1$ of the substrate 11 defined as a medium 1 as 1.57, the complex index of refraction of the information recording layer 12 defined as a medium 2 as $2.5-i\cdot 0.12$, the refractive index $n_3$ of the spacer layer 13 as 1.5, and the light wavelength $\lambda$ as 500 nm. As understood from this FIG. 4, $R_1$ and $R_2$ become almost equal at two regions of d, around 50 nm and around 150 nm. Thus, the value d may be any of the values in those two regions. From the view point of the reproduction sensitivity, a large light absorptivity A of the first information recording part $L_1$ may be disadvantageous, but the heat absorption of the first information recording part $L_1$ becomes large for the same power of the information recording light and the recording sensitivity of the first information recording part $L_1$ becomes high. Consequently, for increasing the recording sensitivity of the first information recording part $L_1$, the d should preferably be in the region around 150 nm, at which A becomes about 30%. The value in this region will assure a satisfactory recording sensitivity. The light absorptivity A of the first information recording part $L_1$ should preferably be 20 to 50% for keeping the balance between reproduction sensitivity, the recording sensitivity, and the laser power to be used as mentioned above.

The region in which $R_1$ and $R_2$ becomes almost equal at around 150 nm of d is in a range of about 150 nm ±20%. And, the thickness of the information recording layer 12 and its tolerance are enough for mass production of the optical disk. However, in a region around 150 nm of d, both $R_1$ and $R_2$ are about 10%, but the value is enough for reproducing information from the optical disk.

Subsequently, a configuration of the optical information recording/reproducing apparatus used for recording/reproducing information on/from the optical disk 10 in this embodiment shown in FIG. 3 will be explained with reference to FIG. 5.

This optical information recording/reproducing apparatus 20 is provided with a semiconductor laser 21 projecting a blue laser light having a wavelength of 500 nm used for recording/reproducing information on/from the optical disk 10. The optical information recording/reproducing apparatus 20 is also provided with a collimate lens 22, a beam splitter 23, a tracking mirror 24, and an objective lens 25 arranged sequentially from the semiconductor laser 21 as an optical system directing the laser beam emitted from the semiconductor laser 21 to the optical disk 10. The objective lens 25 is held movably in the direction vertical to the surface of the optical disk 10 by a focusing actuator 26 at a position facing the surface of the optical disk 10. The tracking mirror 24 is held by a tracking actuator 27 so as to be able to move the laser projecting point in the traverse direction of the tracks of the optical disk 10. The optical information recording/reproducing apparatus 20 is further provided with a half-wave plate 28, a lens 29, and a polarizing beam splitter 30 arranged sequentially from the beam splitter 23 in the traveling direction of the light returned from the optical disk 10 and reflected by the beam splitter 23. At the point receiving the light returned from the optical disk 10 and reflected by the polarizing beam splitter 30 and at the point receiving the light returned from the optical disk 10 and transmitting the polarizing beam splitter 30 are arranged photodetectors 31 and 32 respectively. The optical information recording/reproducing apparatus 20 is further provided with a coil for applying an external magnetic field, arranged at a position facing the objective lens 25 over the optical disk 10. Of those components at least the tracking mirror 24, the objective lens 25, the focusing actuator 26, and the tracking actuator 27 are mounted on a movable structure 35 that can move in the traverse direction of the tracks of the optical disk 10.

The optical information recording/reproducing apparatus 20 is further provided with a driver 36 for moving the movable structure 35 in the traverse direction of the tracks; a driving circuit 37 for driving the semiconductor laser 21; a driving circuit 38 for supplying power to a coil 33; a focus servo circuit 39 for controlling the focus actuator 26 according to the signal output from the photodetector 31 to carry out the focus servo operation; a tracking servo circuit 40 for controlling the tracking actuator 27 according to the signal output from the photodetector 32 to carry out the tracking servo operation; a reproduced signal detecting circuit 41 for detecting a reproduced signal according to the signals output from the photodetectors 31 and 32; and a controller 42 for controlling those items. In addition to those described above, the optical information recording/reproducing apparatus 20 is also provided with a motor for turning the optical disk 10 and a motor servo circuit for driving the motor with a rotation speed changed or held at a fixed value, but they are not illustrated in FIG. 5.

As the focus servo operation method, there are various methods available, including an astigmatism method, knife-edge method, etc. According to the adopted method, the photodetector 31 is divided into four or two, and a cylindrical lens, knife-edge, etc. are provided as needed in the optical path of the returned light from the optical disk 10 to the photodetector 31. Furthermore, various tracking servo method such as a push-pull method and a 3-beam method are available. And, according to the adopted method, the photodetector 32 is divided into two or more, or an optical element is provided as needed for separating the beam incident on the optical disk 10 into 3 beams.

Subsequently, the operation of the optical information recording/reproducing apparatus 20 shown in FIG. 5 and the operation of the optical disk shown in FIG. 3 will be explained.

At first, how information is recorded on the first information recording part $L_1$ (information recording layer 12) of the optical disk 10 will be explained. In this case, the movable structure 35 is moved by the driver 36 so that the laser light can be projected on the selected track, as well as the focus servo circuit 39 is controlled by the controller 42 to position the focal point of the laser light converged by the objective lens 25 on the information recording layer 12. Furthermore, the coil 33 is energized by the driving circuit 38 to generate an external magnetic field in the specified direction. Before recording information, the information recording layer 12 is magnetized in advance only in the direction vertical to the surface of the optical disk 10, and the external magnetic field generated by the coil 33 is in the opposite direction of the pre-aligned polarity of magnetization. In this state, the controller 42 controls the driving circuit 37 to make the semiconductor laser 21 emit the laser light according to the information to be recorded with the pulse-shaped power for information recording. The light for information recording is converged on the information recording layer 12 via the collimate lens 22, the beam splitter 23, the tracking mirror 24, and the objective lens 25. Of the information recording layer 12, the part on which the information recording light is projected has a temperature locally rised over the Curie point and magnetized in the direction of the external magnetic field, by which information is recorded on that part. When erasing information recorded in the information recording layer 12, an external magnetic field is generated by the coil 33 in the opposite direction of the magnetic field in recording information. In this case, all the processings except for continuously projecting the laser light on the information recording layer 12 are the same as those for recording information.

When recording or erasing information on/from the second information recording part $L_2$ (information recording layer 15) of the optical disk 10, the focal point of the laser light converged by the objective lens 25 is made to be positioned on the information recording layer 15. Other processings are all the same as those for recording and erasing information on and from the first information recording part $L_1$ (information recording layer 12).

Subsequently, how to reproduce information from the first information recording part $L_1$ (information recording layer 12) of the optical disk 10 will be explained. In this case, the driver 36 moves the movable structure 35 so as to position the laser light projected on the specified track of the optical disk 10, while the controller 42 controls the focus servo circuit 39 to position the focal point of the laser light converged by the objective lens 25 on the information recording layer 12. Furthermore, the controller 42 controls the driving circuit 37 to project the laser light from the semiconductor laser 21 as a information reproducing light with a power for recording information. This information reproducing light is converged on the information recording layer 12 via the collimate lens 22, the beam splitter 23, the tracking mirror 24, and the objective lens 25. The information reproducing light is then reflected by the information recording layer 12. At this time, the plane of polarization of the information reproducing light rotates in the direction opposite to each other according to the direction of magnetization in the information recording layer 12 which is opposite to each other where the information is recorded and where no information recorded. This rotation of the plane of polarization is called as an apparent Kerr rotation which is a composition of the rotation by the magneto-optic Kerr effect of the light reflected on the surface of the information recording layer 12 on the side of the substrate 11 and the rotation by the Faraday effect of the light passing through the information recording layer 12, reflected at the boundary surface of the spacer layer 13, and then passing through the information recording layer 12 again. The returned light from the information recording layer 12 whose plane of polarization is rotated by the apparent Kerr rotation is incident on the beam splitter 23 again via the objective lens 25 and the tracking mirror 24, and part of the light is reflected to be incident on the polarizing beam splitter 30 via the half-wave plate 28 and the lens 29. The light incident on the polarizing beam splitter 30 is then split into two components whose planes of polarization are orthogonal to each other and respectively detected by the photodetectors 31 and 32. Then, the reproduced signal detecting circuit 41 detects the difference between the outputs from the photodetectors 31 and 32 to obtain the reproduced signals.

When reproducing information recorded in the second information recording part $L_2$ (information recording layer 15) of the optical disk 10, the focal point of the laser light converged by the objective lens 25 is positioned on the information recording layer 15. Other processings are all the same as those for reproducing information recorded in the first information recording part $L_1$ (information recording layer 12).

As explained above, the optical disk 10 in this embodiment comprises two erasable information recording layers 12 and 15 on one side and the first information recording layer 12 on the light incident side is formed with a magneto-optical recording material made of bismuth-substituted magnetic garnet (extinction coefficient k: about 0.12) having a large magneto-optic effect and a small light absorptivity, the light absorptivity of the first information recording layer 12 per unit thickness is satisfactorily small and the thickness of the first information recording layer 12 and its tolerance can be set large enough to cope with mass production of the optical disk 10. Consequently, this embodiment can realize an optical disk having two erasable information recording layers which can be made to have a large capacity and enabling the thickness of the information recording layer 12 to be so easily controlled as to allow mass-production. Furthermore, the optical information recording/reproducing apparatus 20 according to this embodiment can also record/reproduce information in/from any of the two erasable information recording layers 12 and 15 of the optical disk 10.

In this embodiment, a blue laser light having a wavelength of 500 nm is used as an information reproducing light and bismuth-substituted iron garnet is used to form the information recording layer 12. Since, the bismuth-substituted iron garnet has a large magneto-optic effect in a short wavelength region of around 500 nm (See Journal of the Magnetics Society of Japan, Vol. 11, No. 2, pages 147 to 152 (1987) and ibid. Vol. 15, No. 2, pages 209 to 212 (1991), both in Japanese), this embodiment can increase the output for reproducing and improve the SN ratio (signal-to-noise ratio) significantly.

Subsequently, the optical disk in the second embodiment of this invention will be explained. The optical disk 10 in this embodiment is designed so as to use a laser light having a wavelength of 780 nm as the information reproducing light. This optical disk 10 has the same cross sectional structure as that shown in FIG. 3, but the first information recording layer 12 thereof is formed with cobalt ferrite. The composition of cobalt ferrite is generally represented as $CoFe_{2-x}M_xO_4$ ($0 \leq x < 2$). M indicates a transition metal element other than Fe, such as Rh, and the like. In this embodiment, $CoFe_2O_4$ is used as cobalt ferrite for forming the information recording layer 12. The complex index of refraction n–ik of $CoFe_2O_4$ is about 2.7–i.0.124 at a wavelength of 780 nm and the extinction coefficient k, which is a coefficient of the imaginary part of a complex index of refraction, is about 0.124 (Proc. SPIE, Vol. 420, page 231(1983)).

Figure 6:
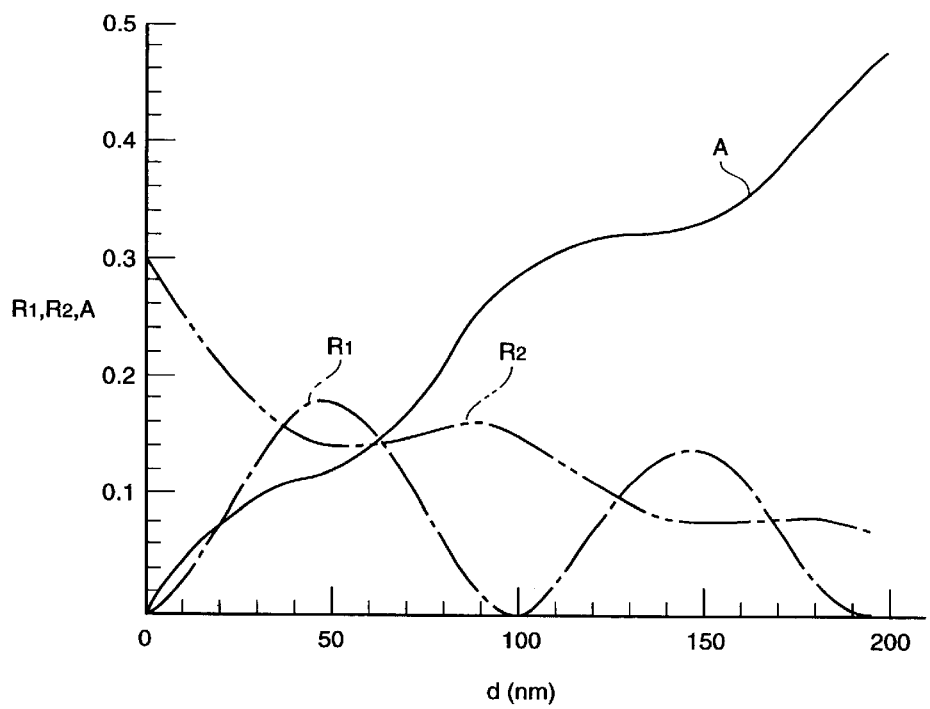
FIG. 6 is a graph showing the respective relationships between the thickness of the information recording layer of the first information recording part of an optical disk in the second embodiment of this invention and each of the intensity reflectivity of the first information recording part, the final intensity reflectivity of the second information recording part, and the light absorptivity of the first information recording part.

FIG. 6 shows the respective relationships between the thickness d (nm) of the information recording layer 12 and each of the intensity reflectivity $R_1$ of the first information recording part $L_1$, the final intensity reflectivity $R_2$ of the second information recording part $L_2$, and the light absorptivity A of the first information recording part $L_1$ obtained by calculations similar to those for the first embodiment under the same conditions as those of the first embodiment except for the complex index of refraction and wavelength of the information recording light. As understood from this FIG. 6, there are some regions of d in which $R_1$ and $R_2$ become almost equal. When selected so that A becomes 30%, however, the region of d comes at around 180 nm. In this regions, both $R_1$ and $R_2$ become about 10%, which is an enough value for reproducing information from the optical disk 10.

According to the optical disk 10 in this embodiment, the first information recording layer 12 on the light incident side is formed by a magneto-optical recording material made of cobalt ferrite (extinction coefficient k: about 0.124) having a small light absorptivity, so that the light absorptivity of the first information recording layer 12 per unit thickness becomes satisfactorily small and the thickness of the first information recording layer 12 and its tolerance can be set large enough to cope with mass production of the optical disk 10. Consequently, this embodiment can realize an optical disk having two erasable information recording layers which can be made to have a large capacity, and enabling the thickness of the information recording layer 12 to be so easily controlled as to allow mass-production.

Figure 5:
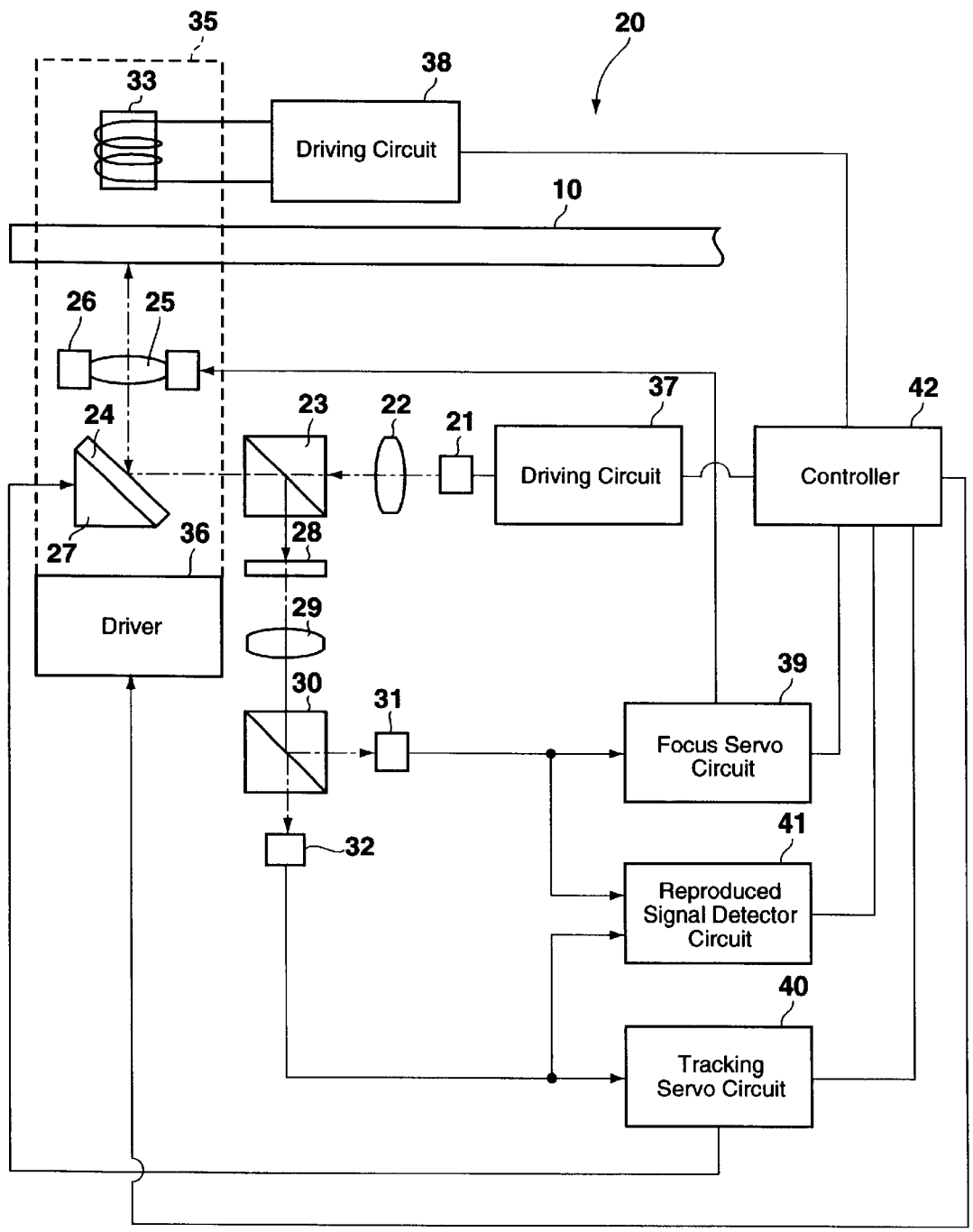
FIG. 5 is a diagram explaining a configuration of the optical information recording/reproducing apparatus in the first embodiment of this invention.

The optical inforamtion recording/reproducing apparatus used for recording/reproducing information on/from the optical disk 10 in this embodiment is the same as the optical information recording/reproducing apparatus 20 shown in FIG. 5 except that the semiconductor laser 21 emits a light having a wavelength of 780 nm in this embodiment. Other configurations and operations in this embodiment are the same as those in the first embodiment.

Subsequently, a study will be made for the limit of the extinction coefficient k used for deciding the light absorption characteristics in the complex index of refraction elements of the magneto-optical recording material forming the information recording layer 12 so as to decide the conditions for selecting a magneto-optical recording material for forming the information recording layer 12 of the optical disk 10 having the cross sectional configuration shown in FIG. 3.

Figure 7:
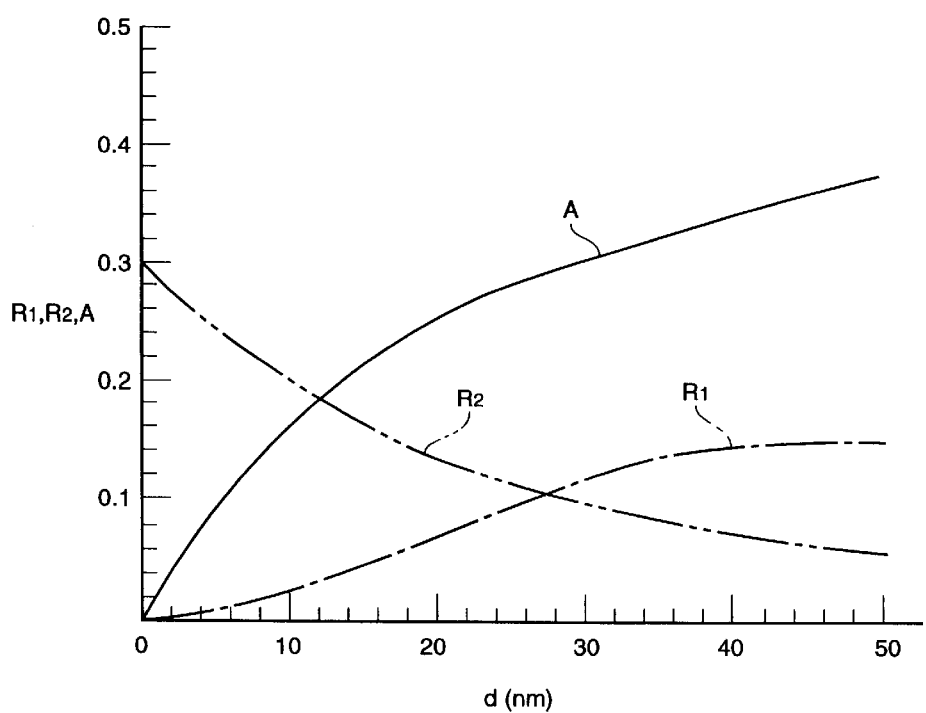
FIG. 7 is a graph showing the respective relationships between the thickness of the information recording layer of the first information recording part and each of the intensity reflectivity of the first information recording part, the final intensity reflectivity of the second information recording part, and the light absorptivity of the first information recording part when the extinction coefficient k of the magneto-optical recording material used for forming the information recording layer of the first information recording part of the optical disk in the configuration shown in FIG. 3 is 0.5.
Figure 8:
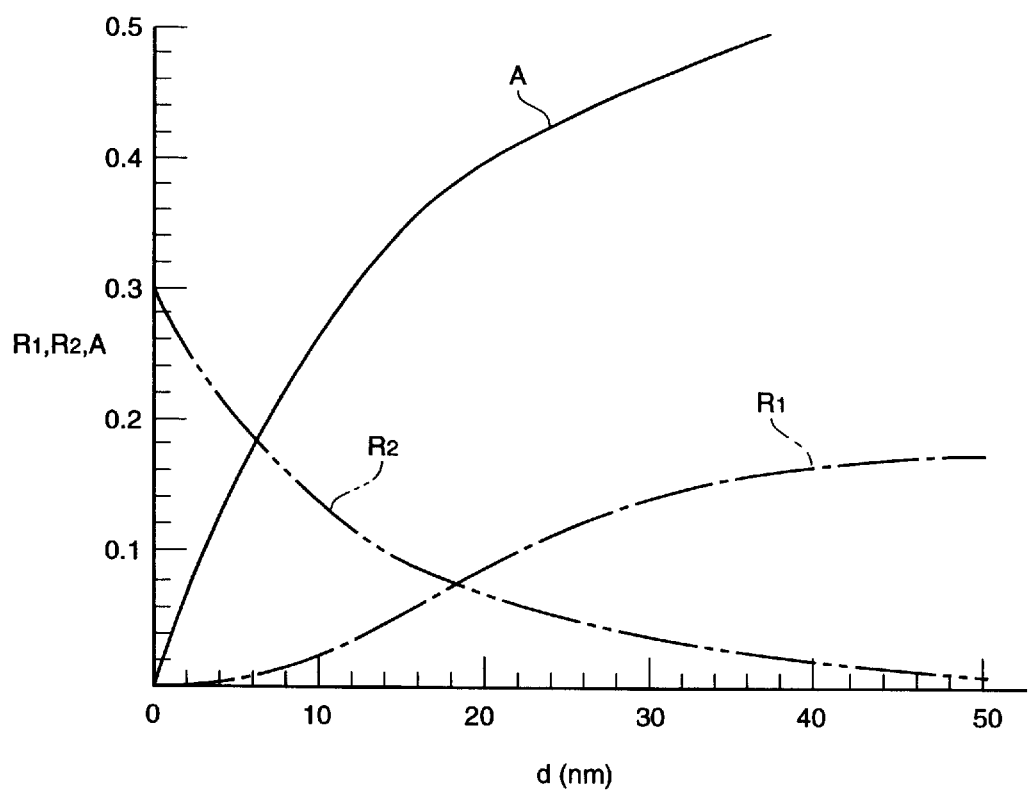
FIG. 8 is a graph showing the respective relationships between the thickness of the information recording layer in the first information recording part and each of the intensity reflectivity of the first information recording part, the final intensity reflectivity of the second information recording part, and the light absorptivity of the first information recording part when the extinction coefficient k of the magneto-optical recording material used for forming the information recording layer of the first information recording part of the optical disk in the configuration shown in FIG. 3 is 1.0.

Here, the wavelength is taken as 500 nm and the real part n (refractivity) in the complex index of refraction n–ik for the magneto-optical recording material used for forming the information recording layer 12 is taken as 2.5. Then, the respective relationships between the thickness d (nm) of the information recording layer 12 and each of the intensity reflectivity $R_1$ of the first information recording part $L_1$, the final intensity reflectivity $R_2$ of the second information recording part $L_2$, and the light absorptivity A of the first information recording part $L_1$ are obtained by calculations similar to those for the first embodiment when the extinction coefficients k are 0.5 and 1.0. FIG. 7 shows the respective relationships between d and each of $R_1$, $R_2$, and A when the extinction coefficient k is 0.5. FIG. 8 shows the respective relationships between d and each of $R_1$, $R_2$, and A when the extinction coefficient k is 1.0.

As understood from FIG. 7, when the extinction coefficient k is 0.5, $R_1$ and $R_2$ become almost equal in the region of d at about 27 nm. Since the region in which $R_1$ and $R_2$ become almost equal is so wide that the thickness of the information recording layer 12 can be easily controlled. In this region, both $R_1$ and $R_2$ are about 10% which is an enough value for reproducing information from the layer 12.

On the other hand, when the extinction coefficient k is 1.0, as understood from FIG. 8, $R_1$ and $R_2$ become almost equal in the region of d at about 18 nm. This region is narrower than that when the extinction coefficient k is 0.5. In this region, both $R_1$ and $R_2$ are about 9% which is an enough value for reproducing information form the layer 12.

Here, let a reflective unbalance RU be used which is represented by the following expression as a measure for judging the difficulty of controlling the thickness d of the information recording layer 12.

$$RU=2|R_1-R_2|/(R_1+R_2)$$

This reflective unbalance RU indicates a degree of unbalance between the reflectivities of $R_1$ and $R_2$. The smaller the value is, the smaller the unbalance of the reflectivity $R_1$ and $R_2$ become, and the smaller value of RU is preferable for the stability of the reproducing operation of the optical information recording/reproducing apparatus. Thus, a condition of $RU \leq 20\%$ is specified and the range of the thickness d of the information recording layer 12 that satisfies this condition is taken as a measure for judging the difficulty in controlling the thickness d of the information recording layer 12 in this embodiment.

Figure 1:
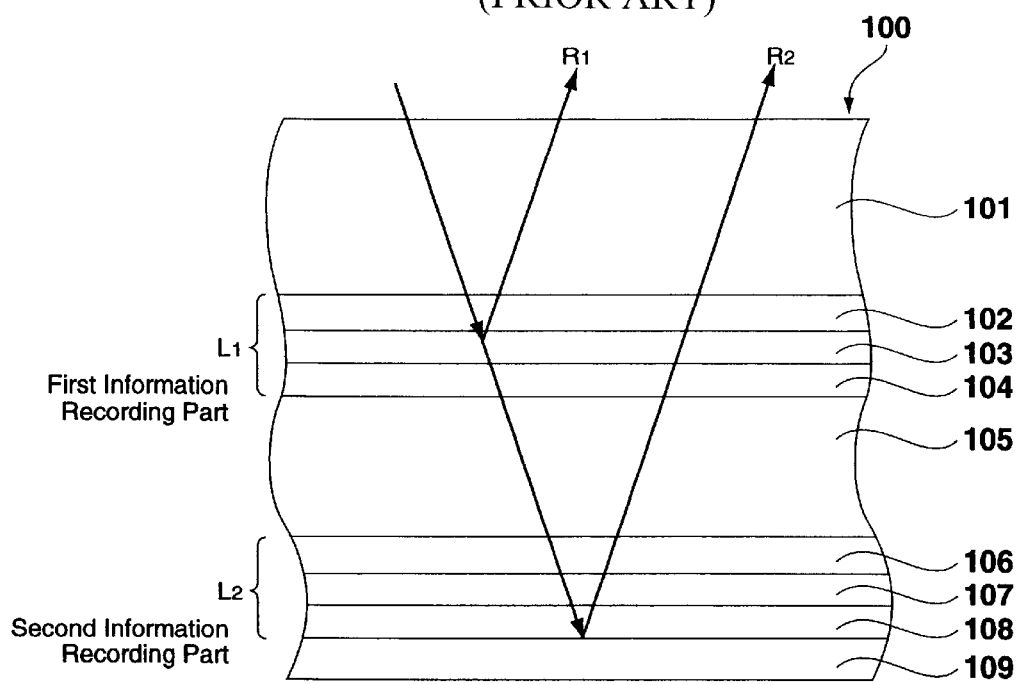
FIG. 1 is a cross sectional view showing a structure of a typical design example of an optical disk provided with two information recording layers on one side.
Figure 2:
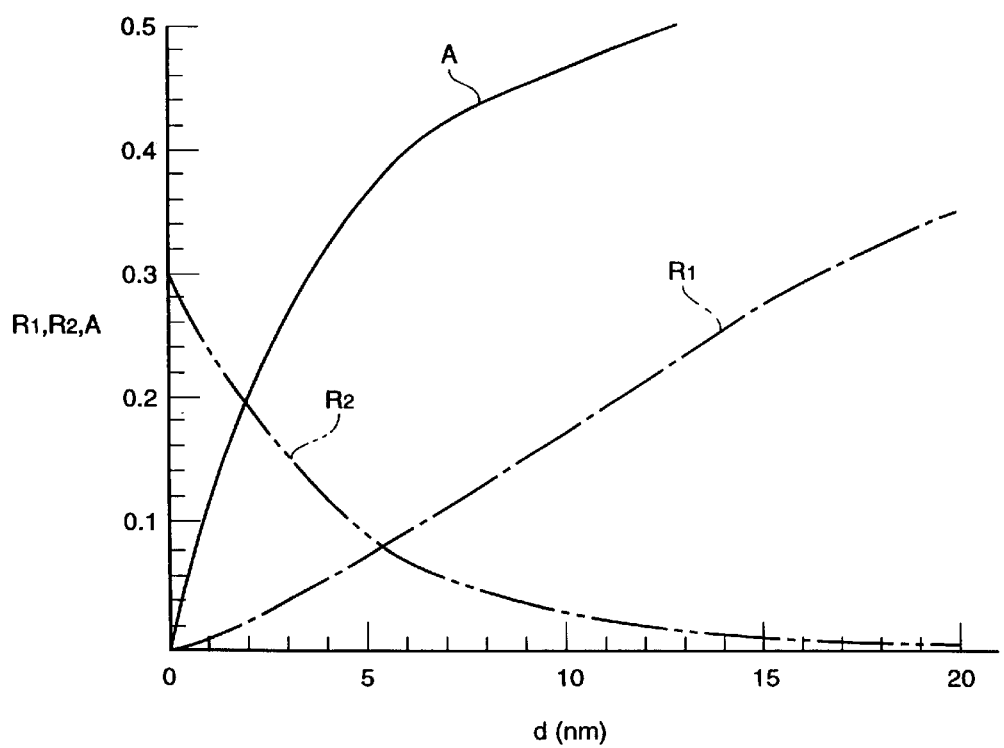
FIG. 2 is a graph showing the respective relationships between the thickness of the information recording layer of the first information recording part of an optical disk in the configuration shown in FIG. 1 and each of the intensity reflectivity of the first information recording part, the final intensity reflectivity of the second information recording part, and the light absorptivity of the first information recording part.
Figure 9:
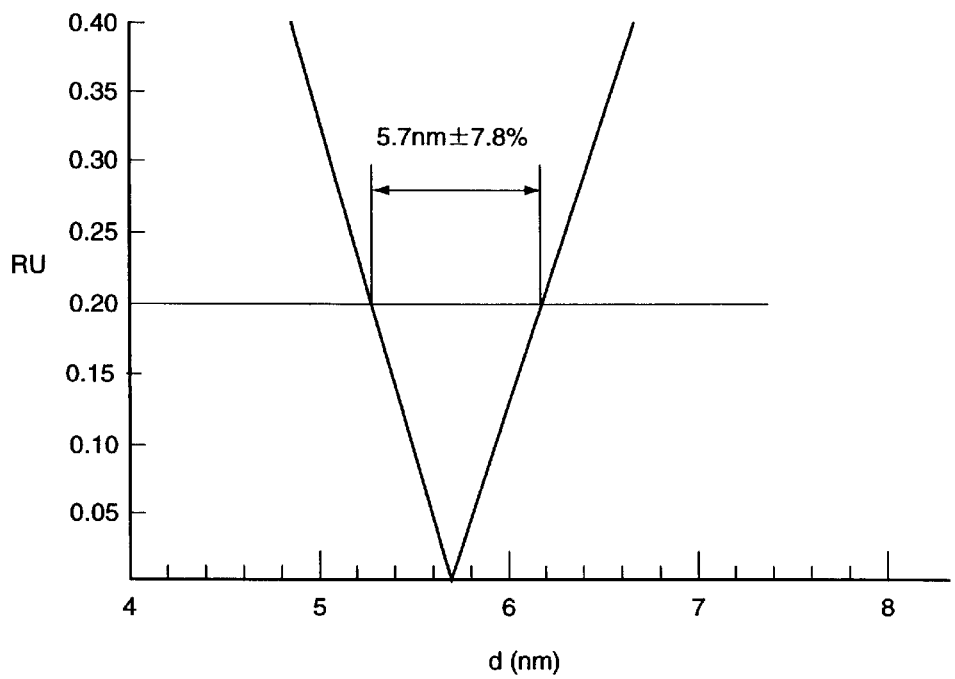
FIG. 9 is a graph showing the relationship between the thickness of the first information recording layer of the optical disk provided with two information recording layers and the reflective unbalance, wherein TbFeCo is used as the first information recording layer.
Figure 10:
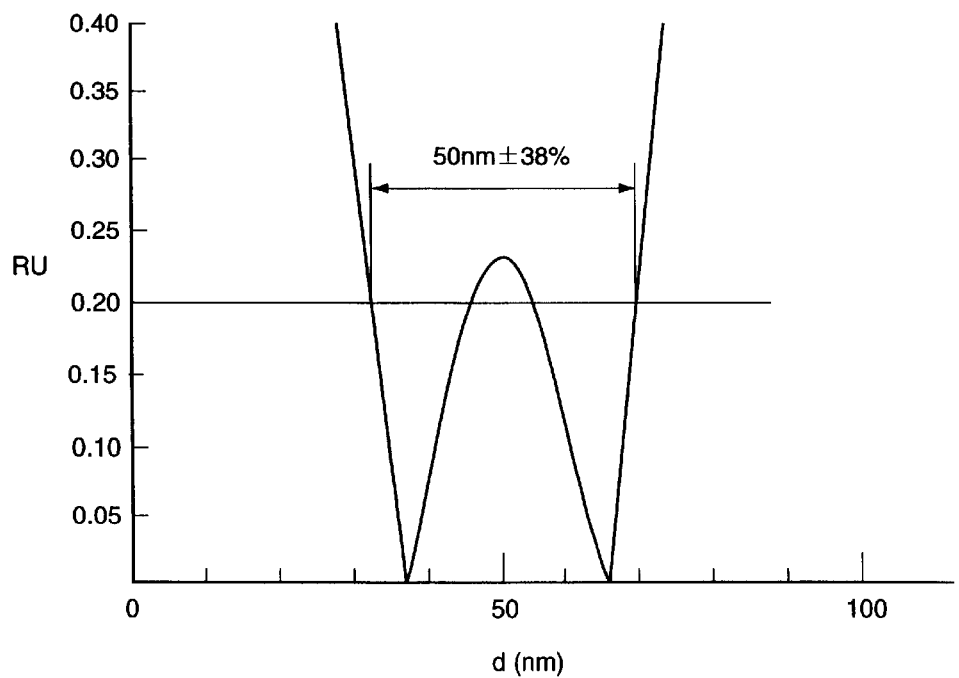
FIG. 10 is a graph showing the relationship between the thickness of the information/recording layer in the first information recording part and the reflective unbalance under the condition shown in the first embodiment of this invention.

FIG. 9 is a graph showing the relationship between d and RU in the case shown in FIG. 1 in which TbFeCo is used for the information recording layer 103 of the first information recording part $L_1$ and the respective relationships between d and each of $R_1$ and $R_2$ have the characteristics as shown in FIG. 2, and is used for comparison. In this case the range of d satisfying the condition of $RU \leq 20\%$ is within ±7.8% around 5.7 nm. Consequently, the margin of d is ±7.8%. FIG. 10 is a graph showing the relationship between d and RU in a region in which d is around 50 nm under the condition shown in the first embodiment when the respective relationships between d and each of $R_1$ and $R_2$ have the characteristics shown in FIG. 2. In this case, the range of d satisfying $RU \leq 20\%$ is within ±38% around 50 nm, although part of RU exceeds 20%. Thus, the margin of d becomes ±38%.

Figure 11:
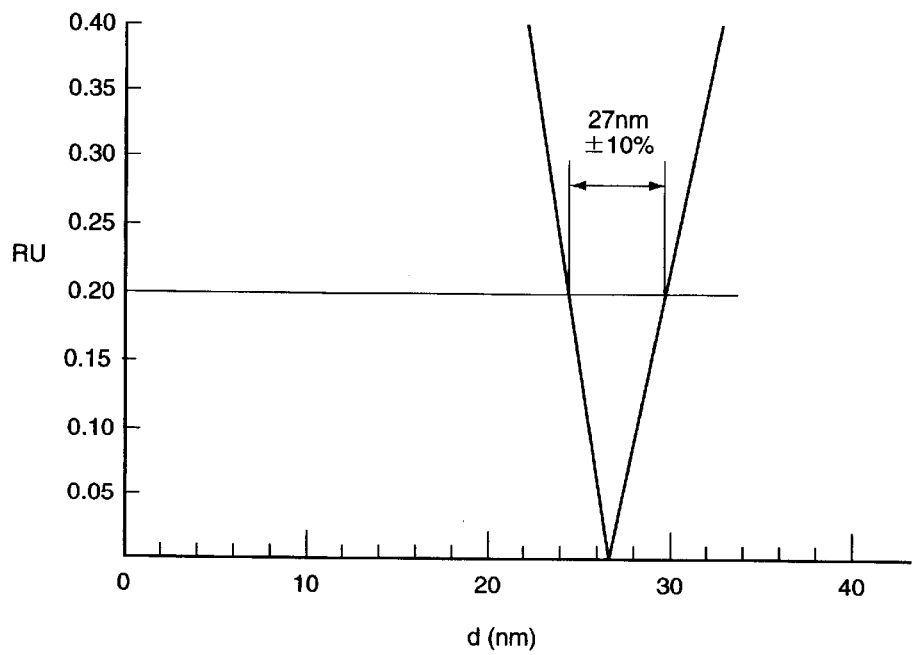
FIG. 11 is a graph showing the relationship between the thickness of the information recording layer of the first information recording part and the reflective unbalance when the extinction coefficient k of the magneto-optical recording material forming the information recording layer of the first information recording part of the optical disk in the configuration shown in FIG. 3 is 0.5.
Figure 12:
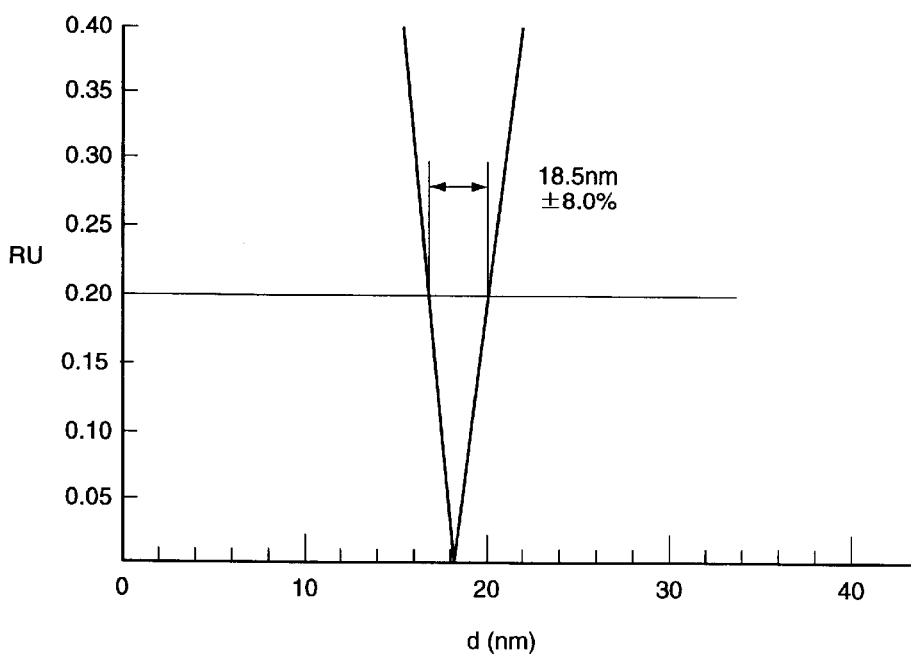
FIG. 12 is a graph showing the relationship between the thickness of the information recording layer in the first information recording part and the reflective unbalance when the extinction coefficient k of the magneto-optical recording material forming the information recording layer of the first information recording part of the optical disk in the configuration shown in FIG. 3 is 1.0.

FIG. 11 shows the relationship between d and RU when the extinction coefficient k is 0.5, that is, when the respective relationships between d and each of $R_1$ and $R_2$ have the characteristics shown in FIG. 7. In this case, the range of d satisfying $RU \leq 20\%$ is within ±10% around 27 nm. Thus, the margin of d becomes ±10%. FIG. 12 is a graph showing the relationship between d and RU when the extinction coefficient k is 1.0, that is, when the respective relationships between d and each of $R_1$ and $R_2$ have the characteristics shown in FIG. 8. In this case, the range of d satisfying $RU \leq 20\%$ is within ±8.0% around 18.5 nm. Thus, the margin of d becomes ±8.0%.

If a condition for facilitating the control of the thickness d of the information recording layer 12 is specified as being that the margin of d satisfying $RU \leq 20\%$ must be equal to or more than that of the comparison example (7.8%) shown in FIG. 9, the extinction coefficient k of the magneto-optical material used for forming the information recording layer 12 must be 1.0 or under. Furthermore, if the margin of d satisfying $RU \leq 20\%$ is specified as being over 10%, the extinction coefficient k must be 0.5 or under.

From the above study, it is found that the favorable condition for the magneto-optical material used for forming the information recording layer 12 is that the extinction coefficient k is 1.0 or under, more preferably 0.5 or under, from the view point of facilitating the control of the thickness of the information recording layer 12.

As magneto-optical materials that will have an extinction coefficient of 1.0 or under, there are the following materials in addition to $Y_2BiFe_{5-x}Ga_xO_{12}$ (k=0.12 at a wavelength of 500 nm) shown in the first embodiment and $CoFe_2O_4$ (k=0.124 at a wavelength of 780 nm) shown in the second embodiment.

$CoRhFeO_4$: k=0.66 at a wavelength of 633 nm, k=0.31 at a wavelength of 780 nm (see IEEE Trans. Mag-11, page 1103 (1975))

$CoCrFeO_4$: k=0.23 at a wavelength of 633 nm, k=0.12 at a wavelength of 780 nm (see IEEE Trans. Mag-11, page 1103(1975))

$BaFe_{12}O_{19}$: $k=0.04$ at a wavelength of 700 nm (see Extended Abstract (32th Spring Meeting, 1985); Japan Soc. Appl. Phys. 30aG-1.2, pages 361–362 (1985) in Japanese)

$BaTiCoFe_{10}O_{19}$: k=0.05 at a wavelength of 780 nm (see Extended Abstract (32th Spring Meeting, 1985); Japan Soc. Appl. Phys. 30aG-1.2, pages 361–362 (1985) in Japanese)

$Gd_3Fe4.34Co_{0.33}Ge_{0.33O}O_{12}$: k=0.01 at a wavelength of 633 nm, k=0.006 at a wavelength of 730 nm, K=0.001 at a wavelength of 780 nm (see IEEE Trans. Mag-8, page 646 (1972)) This invention is not limited only to the embodiments explained above. For example, the second information recording part $L_2$ of the optical disk may also be read-only-memory type or write-once type instead of the erasable type. If it is made to be a read-only-memory type, information pits may be formed, for example, on the surface of the spacer layer 13 opposite to the first information recording part $L_1$, then the pitted surface is covered with a reflective film formed on it. If the part is made to be a write-once type, a write-once type recording layer may be provided in the second information recording part $L_2$. Furthermore, the optical disk may be provided with three or more information recording layers on one side. The optical information recording/reproducing apparatus is also not limited to have the configuration shown in FIG. 5, but can be changed as needed as long as the substantially same functions are provided.

What is claimed is:

1. An optical information recording/reproducing apparatus for recording/reproducing information on/from an optical disk, said optical disk comprising:
a substrate which is transparent with respect to a light beam used to read out information from the optical disk;
a first information recording layer positioned on one side of said substrate, said first information recording layer being of a magneto-optical erasable type and formed from a material whose extinction coefficient, a coefficient of an imaginary part of a complex index of refraction, is between 0.5 and 1.0, said first information recording layer being partially reflective and partially transmissive with respect to said light beam, said first information recording layer having a thickness of 150 nm +/−20%, whereby said thickness of said first information recording layer and its tolerance are set to facilitate mass production of said optical disk without subsequent tuning of said thickness;

a second information recording layer positioned on said one side of said substrate; and a light transmissive spacer layer separating said first and second information recording layers;

wherein, said first and second information recording layers having approximately the same reflectivities $R_1$ and $R_2$, respectively, satisfying the relationship $0.2 \geq 2|R_1 - R_2|(R_1 + R_2)$; and said optical information recording/reproducing apparatus comprising:

means for recording information on said optical disk by projecting and focusing a light for recording said information on said first information recording layer; and means for reproducing information from one said first and second information recording layers by projecting a light beam having a wavelength suitable for making said extinction coefficient of said first information recording layer between 0.5 and 1.0 with said light beam selectively focused on said one of said first and second information recording layers for reproducing said information and detecting said light returned from said one of said first and second information recording layers.

2. An optical disk comprising:

a substrate which is transparent with respect to a light beam used to read out information from the optical disk;

a first information recording layer positioned on one side of said substrate, said first information recording layer being of a magneto-optical erasable type and formed from a material of whose extinction coefficient of an imaginary part of a complex index of refraction is between 0.5 and 1.0, said first information recording layer being partially reflective and partially transmissive with respect to said light beam, said first information recording layer having a thickness of 150 nm +/−20%, whereby said thickness of said first information recording layer and its tolerance are set to facilitate mass production of said optical disk without subsequent tuning of said thickness;

a second information recording layer positioned on said substrate; and a light transmissive spacer separating said first and second information recording layers.

3. An optical disk as defined in claim 2, wherein said first layer is formed with a magneto-optical recording material comprising bismuth-substituted magnetic garnet.

4. An optical disk as defined in claim 2, wherein said first layer is formed with a magneto-optical recording material comprising cobalt ferrite.

5. An optical disk as defined in claim 2, wherein said second information recording layer is also of an erasable magneto-optical type layer.

6. The optical disk of claim 2, wherein said second information recording layer comprises a first dielectric layer adjacent said spacer layer, a recording layer and a second dielectric layer positioned in that order.

* * * * *